(12) United States Patent
Guan et al.

(10) Patent No.: US 9,070,383 B2
(45) Date of Patent: Jun. 30, 2015

(54) GRADED BEVEL TAPERED WRITE POLE DESIGN FOR FIELD ENHANCEMENT

(71) Applicant: Headway Technologies, Inc., Milpitas, CA (US)

(72) Inventors: Lijie Guan, San Jose, CA (US); Po-Kang Wang, Los Altos, CA (US); Moris Dovek, San Jose, CA (US); Joe Smyth, Aptos, CA (US); Kenichi Takano, Cupertino, CA (US); Yoshitaka Sasaki, Santa Clara, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 14/139,091

(22) Filed: Dec. 23, 2013

(65) Prior Publication Data

US 2014/0111887 A1   Apr. 24, 2014

Related U.S. Application Data

(62) Division of application No. 12/150,553, filed on Apr. 29, 2008, now Pat. No. 8,625,234.

(51) Int. Cl.
*G11B 5/23* (2006.01)
*G11B 5/31* (2006.01)
*G11B 5/127* (2006.01)

(52) U.S. Cl.
CPC .............. *G11B 5/1278* (2013.01); *G11B 5/232* (2013.01); *G11B 5/3116* (2013.01); *G11B 5/3146* (2013.01)

(58) Field of Classification Search
CPC ........ G11B 5/1278; G11B 5/23; G11B 5/232; G11B 5/235
USPC .............. 360/119.03, 125.15, 119.04, 125.11
See application file for complete search history.

(56) References Cited

U.S. PATENT DOCUMENTS

| | | | |
|---|---|---|---|
| 6,621,659 | B1 | 9/2003 | Shukh et al. |
| 6,680,815 | B2 | 1/2004 | Sasaki |
| 7,116,517 | B1 | 10/2006 | He et al. |
| 7,133,253 | B1 | 11/2006 | Seagle et al. |
| 7,151,647 | B2 | 12/2006 | Sasaki et al. |
| 7,193,815 | B1 | 3/2007 | Stoev et al. |
| 8,027,125 | B2 | 9/2011 | Lee et al. |
| 2002/0176214 | A1* | 11/2002 | Shukh et al. .................. 360/126 |
| 2003/0112555 | A1 | 6/2003 | Sato et al. |
| 2005/0219743 | A1* | 10/2005 | Guan et al. .................... 360/125 |
| 2006/0044677 | A1 | 3/2006 | Li et al. |
| 2006/0098340 | A1* | 5/2006 | Kameda ........................ 360/126 |
| 2007/0211377 | A1 | 9/2007 | Sasaki et al. |

FOREIGN PATENT DOCUMENTS

JP      2009-111316      10/2013

* cited by examiner

*Primary Examiner* — Craig A. Renner
(74) *Attorney, Agent, or Firm* — Saile Ackerman LLC; Stephen B. Ackerman

(57) ABSTRACT

A structure and a process for a perpendicular write pole that provides increased magnetic flux at the ABS is disclosed. This is accomplished by increasing the amount of write flux that originates above the write gap, without changing the pole taper at the ABS. Three embodiment of the invention are discussed.

6 Claims, 4 Drawing Sheets

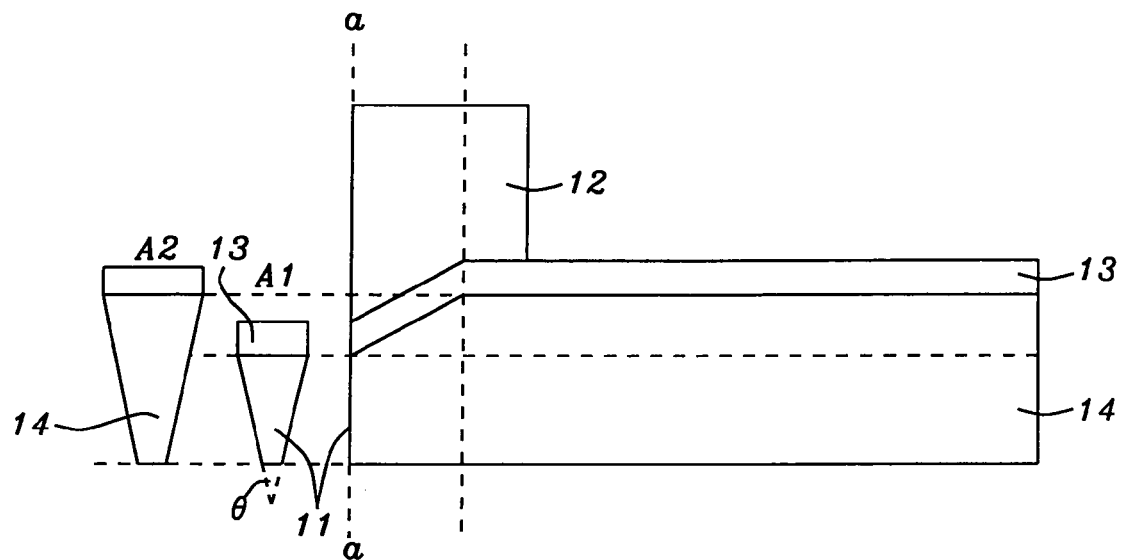
FIG. 1 — Prior Art
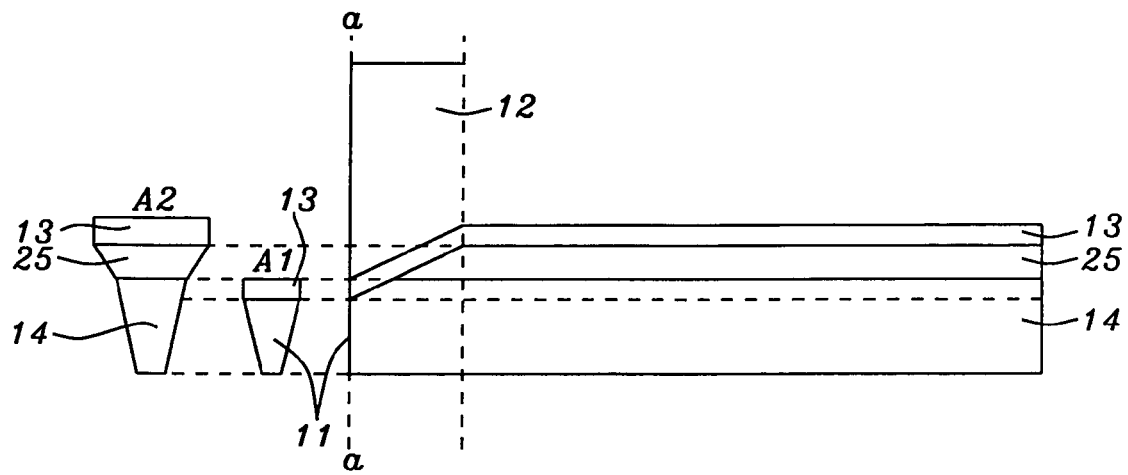
FIG. 2

GRADED BEVEL TAPERED WRITE POLE DESIGN FOR FIELD ENHANCEMENT

This is a Divisional Application of U.S. patent application Ser. No. 12/150,553, filed on Apr. 29, 2008, which is herein incorporated by reference in its entirety, and assigned to a common assignee.

FIELD OF THE INVENTION

The invention relates to the general field of perpendicular magnetic writers with particular emphasis on delivering more flux to the ABS (air bearing surface).

BACKGROUND OF THE INVENTION

Tapered write gaps have been previously used to enhance field and field gradient, as shown in FIG. 1. It is based on the fundamental principle of increasing the choke area around the neck region so that the sides of ABS 11 are not quite parallel but, instead, converge at an angle 8 thereby providing gradual flux concentration to bring additional field to the ABS. Because of the slope of the main pole, the area A2 behind the ABS is larger than the area A1 at the ABS. So a larger ratio of A2 to A1 corresponds to more flux concentration at the ABS. Other elements shown in FIG. 1 include trailing shield 12, write gap 13, and main pole 14.

As track widths narrow, still further enhancements are needed to this flux concentration approach. While steeper tapered write gap angles can increase A2/A1, the main drawbacks are the processing difficulty and too high a sensitivity of the ABS area A1 to the ABS lapping position 'aa'. If the taper angle $\theta$ is too large, a small displacement of ABS line 'aa', caused by the ABS lapping process, will result in a large change in both the ABS area and the physical width of the main pole. Therefore, methods for flux concentration are required that are not overly sensitive to changes in the angle at which the write gap lies relative to the ABS.

A routine search of the prior art was performed with the following references of interest being found:

In U.S. Pat. No. 6,621,659, Shukh et al. say "it is common to taper the pole from the larger width in the paddle region to a narrower width in the pole tip region at the ABS." However, the form of the taper is different from that disclosed by the present invention. U.S. Pat. No. 7,151,647 (Sasaki et al—Headway) shows a yoke portion having a wide portion, a narrow portion, and a sloping flare portion and U.S. Patent Application 2006/0044677 (Li et al—Headway) teaches a plated bevel pole design where the top is wider than the bottom.

U.S. Pat. No. 7,193,815 (Stoev et al) shows an upper section of the write shield wider than the lower section. U.S. Pat. No. 7,116,517 (He et al) teaches a T-shaped pole tip. U.S. Pat. No. 7,133,253 (Seagle et al) discloses a tapered pole tip while U.S. Pat. No. 6,680,815 (Sasaki) shows a tapered write gap as part of their FIG. 9.

SUMMARY OF THE INVENTION

It has been an object of at least one embodiment of the present invention to provide a perpendicular write pole that provides increased magnetic flux at the ABS.

Another object of at least one embodiment of the present invention has been to provide a process for manufacturing said write pole.

Still another object of at least one embodiment of the present invention has been to achieve the above objects without increasing the degree of taper of the pole at the ABS.

A further object of at least one embodiment of the present invention has been to render performance of the completed device insensitive to small variations of the precise location of the ABS relative to other parts of the structure.

These objects have been achieved by increasing the amount of write flux that originates above the write gap without changing the pole taper at the ABS. In a first embodiment, this is achieved by increasing the taper of the section above the write gap. In a second embodiment, this section is extended so that it overlaps the write gap laterally. In a third embodiment, a part of this section is brought closer to the ABS while keeping the main parts of the write pole and the trailing shield well separated, magnetically speaking.

BRIEF DESCRIPTION OF THE DRAWINGS

FIG. 1 shows a tapered write pole of the prior art.
FIG. 2 shows a cross sectional view of the $1^{st}$ embodiment.

DESCRIPTION OF THE PREFERRED EMBODIMENTS

We describe below three embodiments of the invention, presented as processes for manufacturing the invention while also serving to describe the invented structure:

It should be noted that the descriptions that follow below, along with their drawings, are written as though the bodies described there, including in some cases cantilever-like projections, have no external support. In reality, these bodies are embedded in one or more layers of insulating material (typically $Al_2O_3$) which provide whatever mechanical support that is needed without influencing the performance of the device being portrayed. In the interests of simplifying both the descriptions and the figures, these supporting layers are not necessarily shown or mentioned.

FIG. 2 shows the first of the new configurations disclosed in the present invention to enhance flux concentration ratio A2/A1 while still keeping the taper angle of the write gap unchanged. Compared to the prior art shown in FIG. 1, main pole 14 taper is now formed from two layers, 14 and 25.

Figure 7:
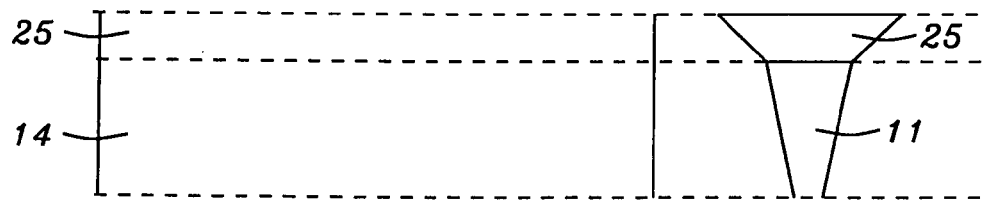
FIGS. 7-8 show process steps to make the $1^{st}$ and 2nd embodiments respectively.

To form layer 14, a first trench, with sidewalls that slope at an angle $\theta$ to the vertical, is formed in a layer of insulation (not shown) to a first depth. This trench is now just filled (overfill followed by CMP) with a layer of material suitable for the main pole followed by a non-magnetic layer (for the write gap). The (filled) first trench is then covered with a second layer of insulation (also not shown). A second trench, whose floor is aligned with the roof of the first trench, is now formed in the second insulation layer, said second trench having sidewalls that slope at an angle greater than $\theta$. The second trench is then just filled with the same material as the first trench, thereby forming layer 25 and completing formation of element 14 as seen in FIG. 7.

This is followed by an angle-lapping step to form the appropriately sloped surface onto which non-magnetic write gap layer 13 is then deposited (as well as being simultaneously deposited onto the top surface of lower pole 14). The process concludes with the deposition and shaping of trailing shield 12.

Thus top part 25 of layer 14 has a larger taper angle than bottom part 11, which increases A2 relative to A1 without increasing the sensitivity of the ABS to the lapping angle. This is because, after tapered write gap 13 is formed, top layer 25 will be recessed from ABS 11 so that the larger taper angle will not change A1 when ABS line 'aa' is moved.

Figure 3:
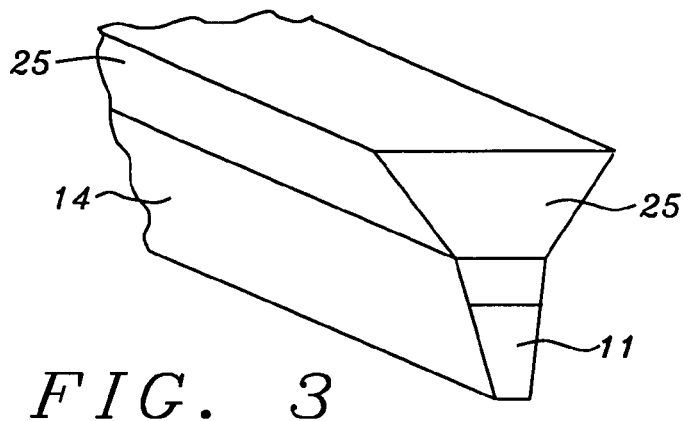
FIG. 3 shows a 3D view of the $1^{st}$ embodiment.

FIG. 3 shows a 3D view of the structure after tapered write gap 13 has been formed.

Figure 4:
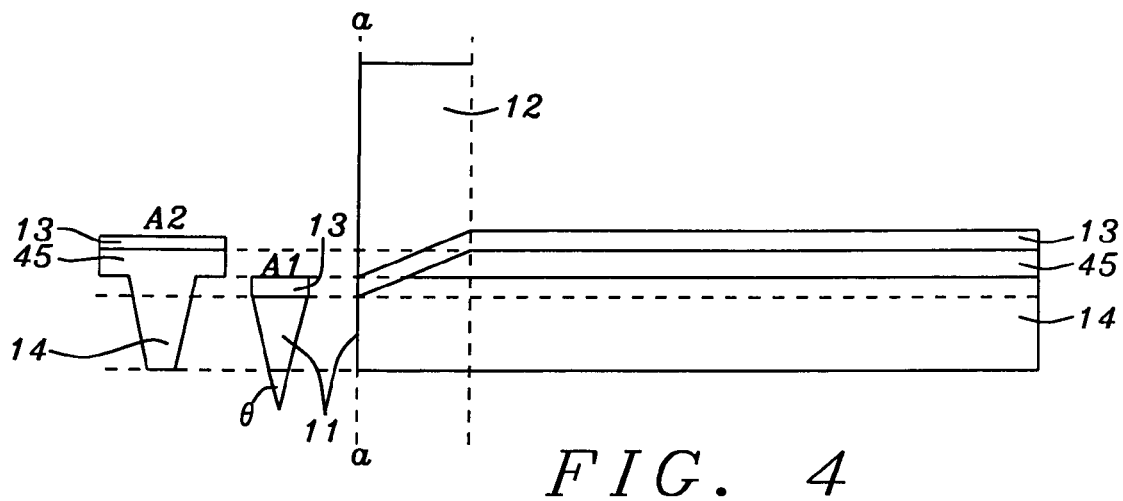
FIG. 4 shows a cross sectional view of the $2^{nd}$ embodiment.
Figure 5:
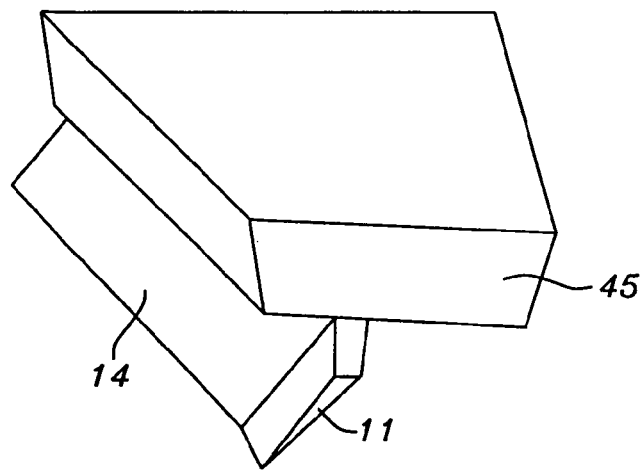
FIG. 5 shows a 3D view of the $2^{nd}$ embodiment.

FIG. 4 (cross sectional view) and FIG. 5 (3D view of FIG. 4) show the $2^{nd}$ embodiment of the invention. It differs from the $1^{st}$ embodiment in that newly added top layer 45 is not simply an extension of bottom layer 14 with a larger taper angle. Instead, layer 45 does not need to be tapered (although using a tapered shape here would still be within the scope of the invention) In FIGS. 4 and 5 we show element 45 as having a rectangular cross-section (our preferred shape) but as long as there is a net increase in the A2/A1 ratio, the objects of the invention will have been met. In general, element 45 will be wider than the top of write gap 13 enabling the achievement of a larger A2/A1.

Figure 8:
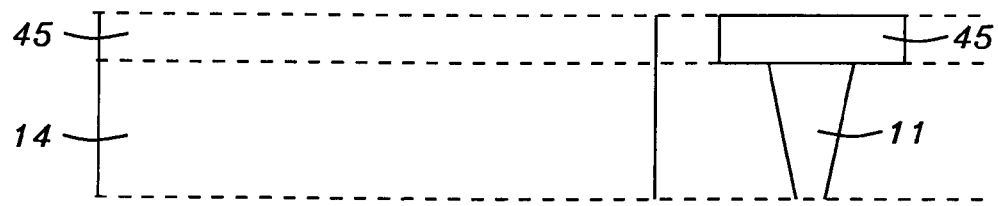

Process-wise the main departure from the first embodiment is that the second trench, also aligned with the first trench and also formed in the second insulation layer, extends outwards from the mouth of the first trench (typically up to about 0.2 to 0.5 microns in each direction) and has straight, as opposed to sloping, sides. As for the first embodiment, the second trench is then just filled with the same material as before, thereby completing formation of element 14 as illustrated in FIG. 8.

Figure 6:
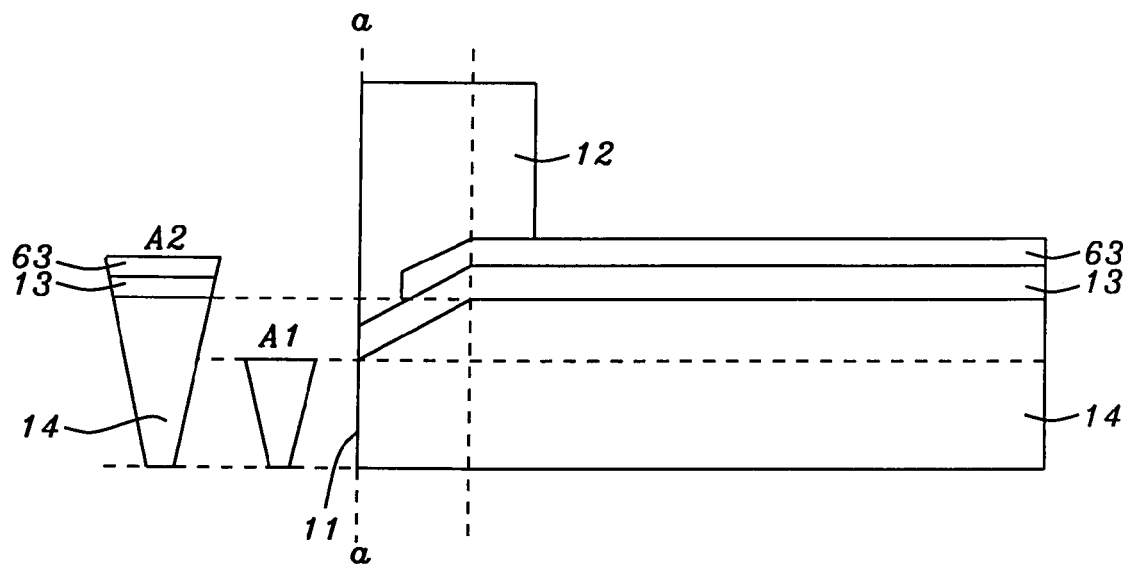
FIG. 6 shows a cross sectional view of the $3^{rd}$ embodiment.

The $3^{rd}$ embodiment takes a different approach from the previous two embodiments. Instead of changing the A2/A1 ratio, a non-uniform write gap is formed. This is illustrated FIG. 6 which shows that extra non-magnetic layer 63 has been inserted between write pole 14 and trailing shield 12. Thus, the write gap is narrower at the ABS and wider away from it. This reduces flux leakage from the main pole to the write shield. Consequently, for a given A2/A1, this larger separation of the main pole from the trailing shield results in more flux being delivered at the ABS, while the field gradient is unchanged since the write gap at the ABS is unchanged.

Figure 9:
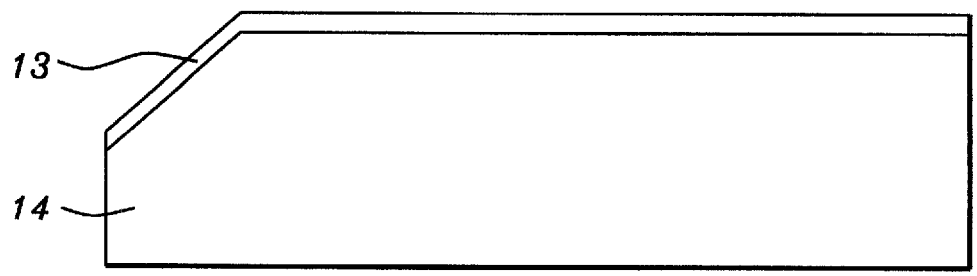
FIG. 9 shows the starting point for manufacturing the $3^{rd}$ embodiment.
Figure 10:
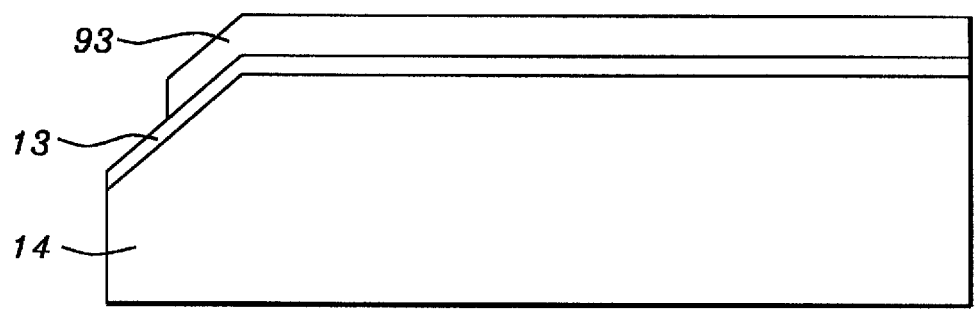
FIGS. 10 and 11 show additional steps in the manufacture of the $3^{rd}$ embodiment.
Figure 11:
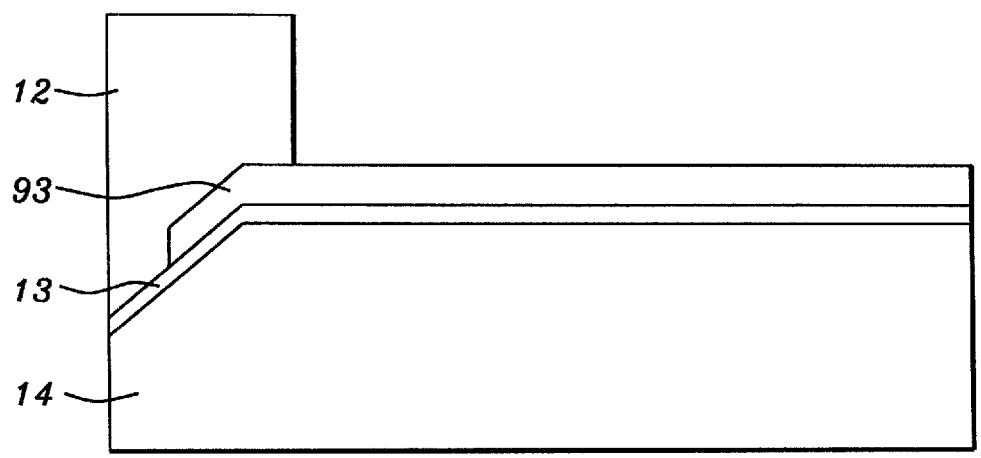

The starting point for forming a write pole built according to the teachings of the third embodiment is similar to the point where, in the first two embodiments, layer 14 has been angle-lapped to provide a suitably tilted surface for layer 13. After deposition of non-magnetic layer 13, as seen in FIG. 9, the non-uniform write gap can be formed by depositing $2^{nd}$ write gap layer 93 which is then patterned so that it terminates at a distance (typically between about 0.05 and 0.2 microns from the ABS. The process ends with the deposition and patterning of layer 12 to form the trailing shield, as shown in FIG. 11.

What is claimed is:

1. A perpendicular magnetic write pole for magnetic recording, having an air bearing surface (ABS), comprising:
   a main pole in the form of a magnetic layer of trapezoidal cross-section, having a beveled upper surface terminating at a first planar edge, said first planar edge being coplanar with the ABS; wherein
   said beveled upper surface comprises a beveled portion making an angle of between about 10 and 45 degrees with the horizontal and extending rearward from said first planar edge and a horizontal portion extending thereafter from said beveled portion;
   formed contiguously on said magnetic layer, a first non-magnetic layer having a second edge that is coplanar with said first edge;
   said first non-magnetic layer further comprising a first part that extends from said second edge along said beveled portion of said upper surface of said magnetic layer and a second part, connected to said first part, that lies on said horizontal portion of said upper surface;
   a second non-magnetic layer formed contiguously on a portion of said first non-magnetic layer, said second non-magnetic layer covering all of said second part and partially covering said first part with the exception of a section of said first part that extends distally for a distance from said first edge and is not covered by said second non-magnetic layer, said second non-magnetic layer having a beveled upper surface substantially parallel with said beveled portion of said upper surface of said magnetic layer; and
   a trailing shield that extends upwards from contact with said first and second non-magnetic layers, said trailing shield having an edge that is coplanar with said first and second edges, whereby, as a result of said two consecutively formed and contiguous write-gap layers, a write gap exists extending at least between said trailing shield and said main pole that is narrower and thinner at the ABS and wider and thicker away from it, thereby reducing flux leakage from said main pole to said trailing shield and delivering more flux at the ABS.

2. The perpendicular magnetic write pole described in claim 1 wherein said magnetic layer has a thickness in the range of from 0.2 to 0.4 microns.

3. The perpendicular magnetic write pole described in claim 1 wherein said first non-magnetic layer has a thickness of up to 0.1 microns.

4. The perpendicular magnetic write pole described in claim 1 wherein said second non-magnetic layer has a thickness of up to 0.2 microns.

5. The perpendicular magnetic write pole described in claim 1 wherein said non-magnetic layers are selected from the group consisting of $Al_2O_3$, $SiO_2$, and all non-magnetic metals.

6. The perpendicular magnetic write pole described in claim 1 wherein said distance over which said second non-magnetic layer does not lie on said first non-magnetic layer is in the range of from 0.05 to 0.2 microns.

* * * * *